United States Patent
Yoshiuchi et al.

(10) Patent No.: US 6,748,807 B2
(45) Date of Patent: Jun. 15, 2004

(54) INERTIA DETECTING TRANSDUCER

(75) Inventors: Shigehiro Yoshiuchi, Osaka (JP); Shusaku Kawasaki, Osaka (JP); Toshiyuki Nozoe, Kyoto (JP); Takeshi Uemura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/239,727

(22) PCT Filed: Jan. 28, 2002

(86) PCT No.: PCT/JP02/00592

§ 371 (c)(1),
(2), (4) Date: Dec. 18, 2002

(87) PCT Pub. No.: WO02/061373

PCT Pub. Date: Aug. 8, 2002

(65) Prior Publication Data

US 2003/0154787 A1 Aug. 21, 2003

(30) Foreign Application Priority Data

Jan. 29, 2001 (JP) .......................................... 2001-019531

(51) Int. Cl.$^7$ ................................................. G01P 1/02
(52) U.S. Cl. .......................... 73/493; 73/514.29; 73/652
(58) Field of Search ................................ 73/493, 514.29, 73/514.16, 488, 652

(56) References Cited

U.S. PATENT DOCUMENTS

| 4,532,451 A | | 7/1985 | Inoue ......................... 310/353 |
| 5,334,901 A | * | 8/1994 | Albert et al. ................ 310/321 |
| 5,554,806 A | | 9/1996 | Mizuno et al. ............... 73/493 |
| 6,405,592 B1 | * | 6/2002 | Murari et al. ................. 73/493 |

FOREIGN PATENT DOCUMENTS

| EP | 0595735 A1 | 3/1994 |
| EP | 0660081 A1 | 6/1995 |
| JP | 63-124666 | 8/1988 |
| JP | 06-160420 | 6/1994 |
| JP | 06-258342 | 9/1994 |
| JP | 07-5065 | 1/1995 |
| JP | 08-43435 | 2/1996 |
| JP | 08-114622 | 5/1996 |

OTHER PUBLICATIONS

International Search Report corresponding to application No. PCT/JP02/00592 dated Apr. 9, 2002.
English Translation of PCT/ISA/210.

* cited by examiner

*Primary Examiner*—Hezron Williams
*Assistant Examiner*—Jacques M. Saint-Surin
(74) *Attorney, Agent, or Firm*—RatnerPrestia

(57) ABSTRACT

An inertia detecting transducer having a reliable detection element. The element is kept to be free from deposition of gas and organic substance generated from resin adhesive. A first case of the transducer has an opening and a circuit component mounted thereon, and is provided with an external electrode and a first connection electrode. A second case includes a detection element mounted inside thereof, and an opening of the case is sealed with a sealing plate. The second case is further provided with a second connection electrode. The second case is attached to the first case so that the former covers the opening of the latter. The second connection electrode and the first connection electrode are electrically coupled. In the above-described configuration of the present invention, if an inertia detecting transducer gets a partial damage, either one of the detection element and the circuit component remaining intact can be re-utilzed.

57 Claims, 11 Drawing Sheets

INERTIA DETECTING TRANSDUCER

This Application is a U.S. National Phase Application of PCT International Applicational PCT/JP02/00592.

TECHNICAL FIELD

The present invention relates to an inertia detecting transducer for use in automobiles, aircraft, cruising vessels and the like transportation equipment, cameras, video cameras and the like imaging apparatus and input devices of electronic apparatus, etc.

BACKGROUND ART

Application field of the inertia detecting transducer includes a video camera. According to a known configuration of such transducers, the detection element and the circuit component are housed in a case.

In the structure where a circuit component and a detection element are housed in a single case, the detection element is exposed to a risk of contamination with gas or organic substance evaporated from resin adhesive used for fixing the circuit component in the case. Solder and flux used for connecting the circuit component may also a source of the contamination. The contamination leads to deterioration of the detection element in the detection characteristics.

Recently, a both-ends-open case with a partition to provide two chambers is used; one chamber for housing a detection element while the other for housing a circuit component. Thereby, it is intended to prevent the gas or organic substance generated from resin adhesive, as well as solder and flux used for connecting circuit component, from sneaking into the chamber of detection element.

In the above two-chambered configuration, a detection element is mounted in one chamber and the detection characteristic is adjusted, and then a circuit element is mounted in the other chamber, and the characteristics are inspected after adjusting operation.

In case a circuit component is damaged inadvertently during the mounting work or in the characteristics adjustment, not only the circuit component itself but also the entire detection element and the case are destined to be a waste. This is a substantial disadvantage in cost.

Even if sequence of the assembly operation is reversed, namely first mounting a circuit component and then a detection element, similar disadvantage is unavoidable.

It may be possible to replace a damaged circuit component by removing the damaged one from the other chamber of the case. However, removing a circuit component, which is fixed to case with resin adhesive and solder, is not an easy job. Even if a circuit component is successfully removed, the case might get a mechanical deformation.

SUMMERY OF THE INVENTION

The present invention aims to offer an inertia detecting transducer that features a high reliability at the detection element. If a part of the inertia detecting transducer is damaged, either one of the detection element and the circuit component remaining undamaged can be saved for re-utilization.

An inertia detecting transducer of the present invention comprises a first case, which has an opening and contains a circuit component. The first case is further provided with an external electrode and a first connection electrode. A second case of the inertia detecting transducer contains a detection element, and an opening of which case is sealed with a sealing plate. The second case is further provided with a second connection electrode. The second case is attached to the first case so that the former covers opening of the latter. And the second connection electrode and the first connection electrode are electrically coupled.

In the above-described configuration, the detection element, which is the key sensing component, is kept free from depositing of gas and organic substance generated from resin adhesive used for fixing a circuit component, and sticking of solder and flux as well. Therefore, the detection element of inertia detecting transducers in the present invention maintains a high reliability. Furthermore, even if the inertia detecting transducer is partly damaged, either one of the detection element and the circuit component left intact can be re-used.

DETAILED DESCRIPTION OF THE PREFEREDEMBODIMENTS

Now in the following, exemplary embodiments of the present invention are described with reference to the drawings FIG. 1 through FIG. 21.

(Embodiment 1)

Figure 1:
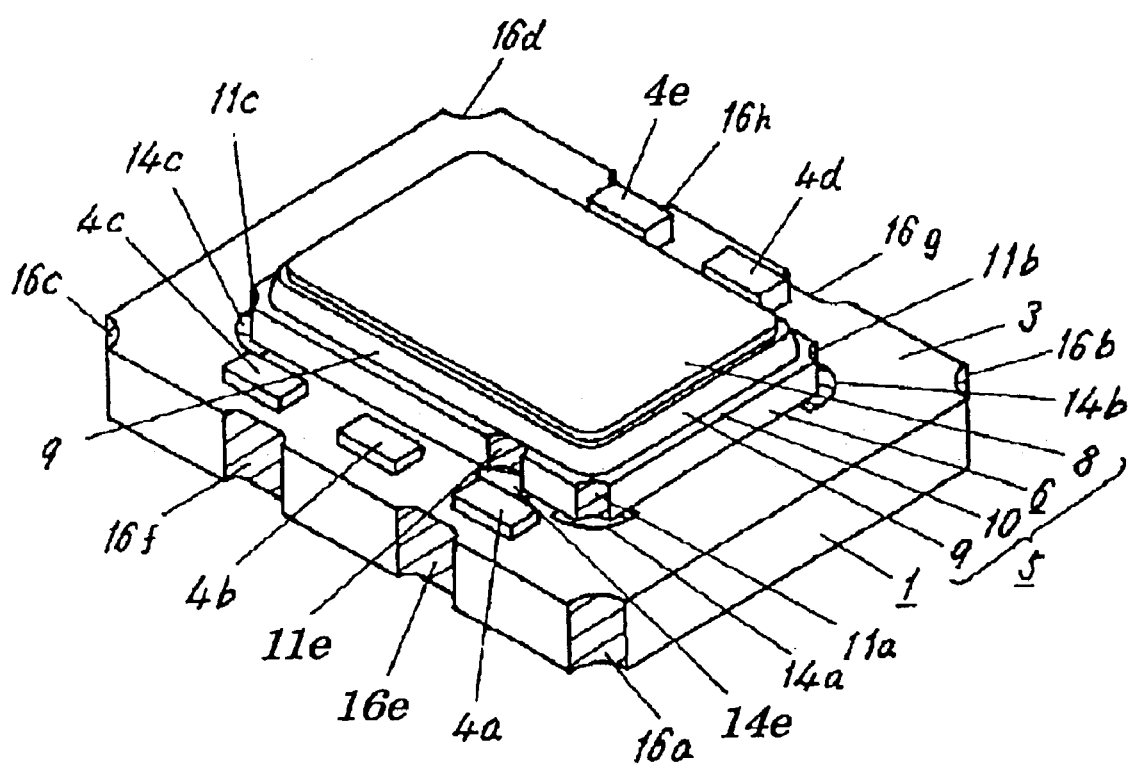
FIG. 1 is a perspective view of an inertia detecting transducer in accordance with a first exemplary embodiment of the present invention.
Figure 2:
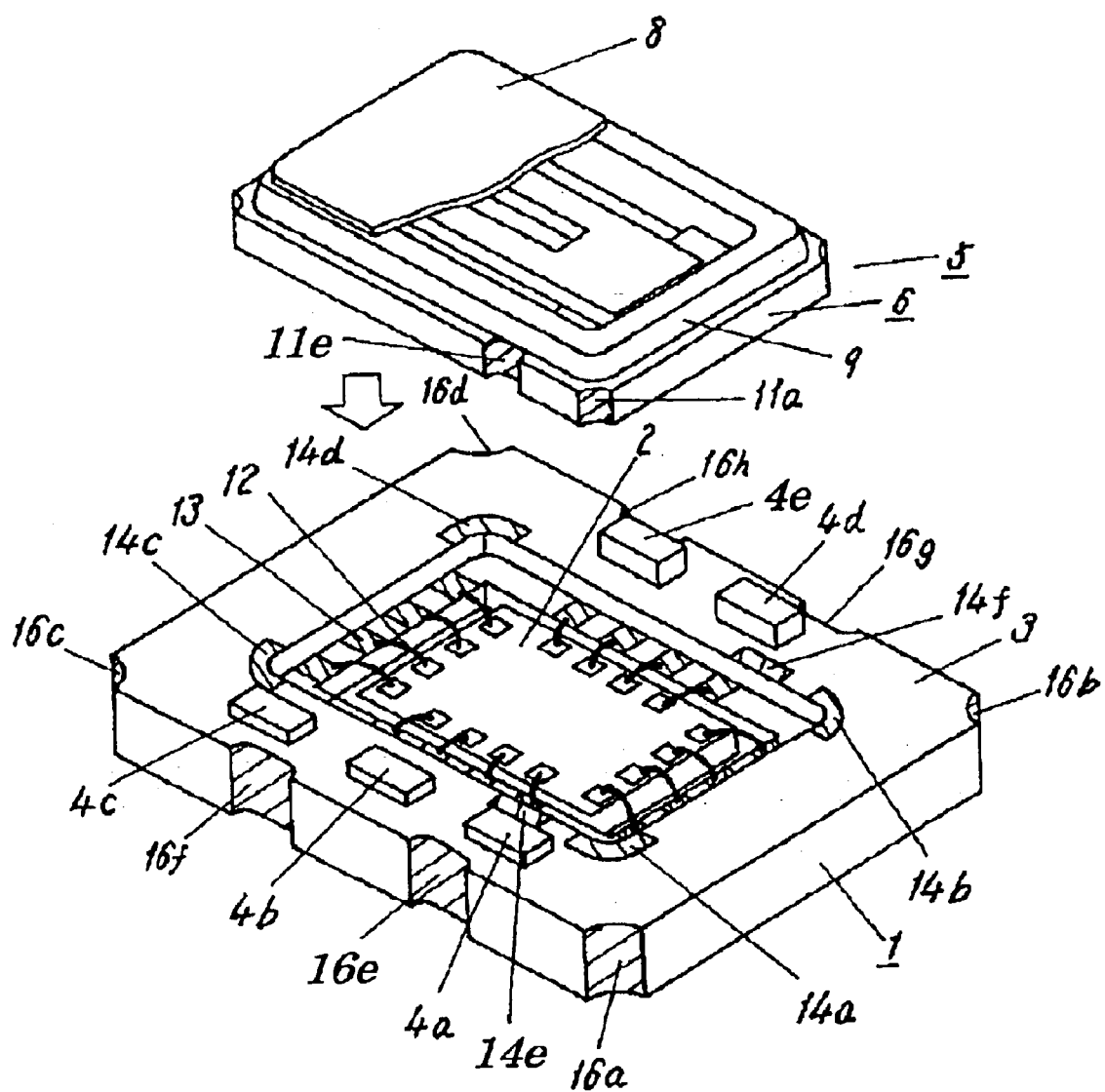
FIG. 2 is the exploded perspective view in accordance with a first exemplary equipment.
Figure 3:
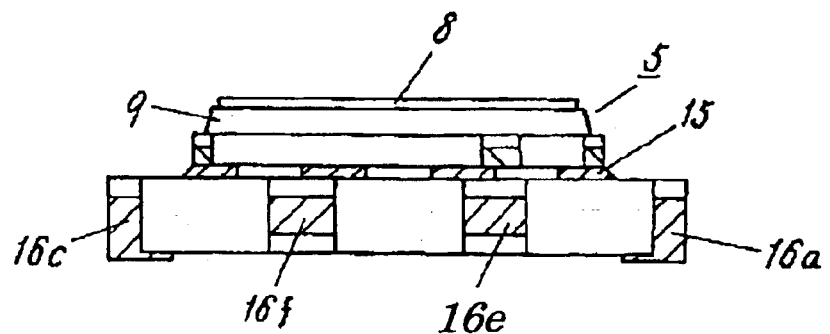
FIG. 3 is a front view of the inertia detecting transducer in accordance with a first exemplary equipment.

FIG. 1 shows perspective view of an inertia detecting transducer in accordance with a first exemplary embodiment of the present invention. FIG. 2 is the exploded perspective view. FIG. 3 shows the front view, FIG. 4 the plan view.

Figure 5:
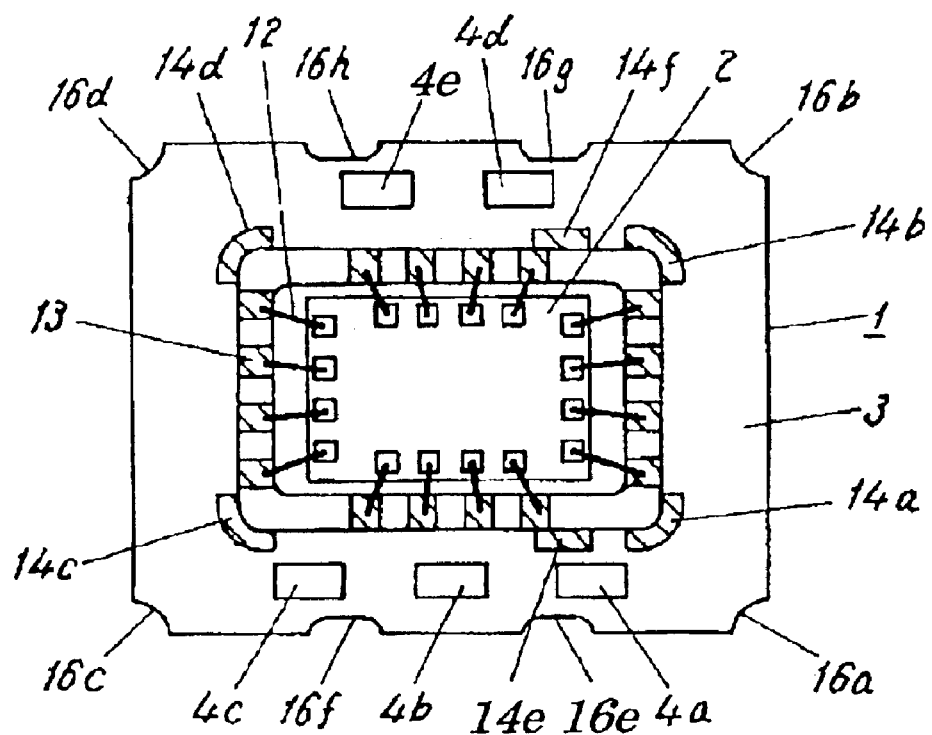
FIG. 5 is a plan view of first case in the first embodiment, with active component mounted thereon.
Figure 6:
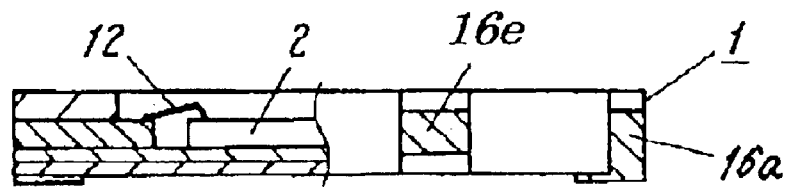
FIG. 6 is a half-sectioned view of the first case mounted with active component in the first embodiment.

FIG. 5 shows a plan view of a first case, with the active component mounted in the exemplary embodiment. FIG. 6 is the half-sectioned front view.

Figure 7:
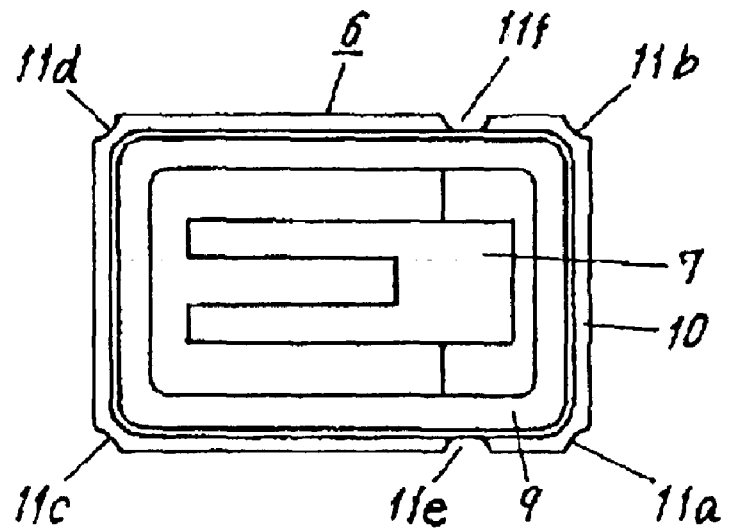
FIG. 7 is a plan view of a detection unit in the first exemplary embodiment, from which the shield plate removed.
Figure 8:
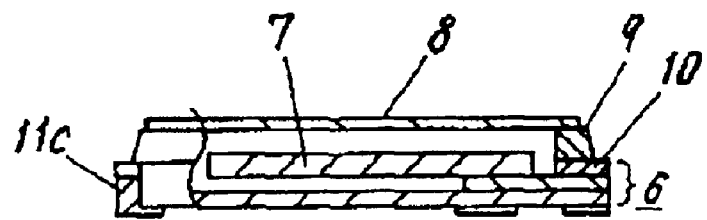
FIG. 8 is a cross sectional front view of the detection unit.

FIG. 7 shows a plan view of a detection unit in embodiment 1, with the shield plate removed. FIG.8 is the cross sectional front view.

Figure 9:
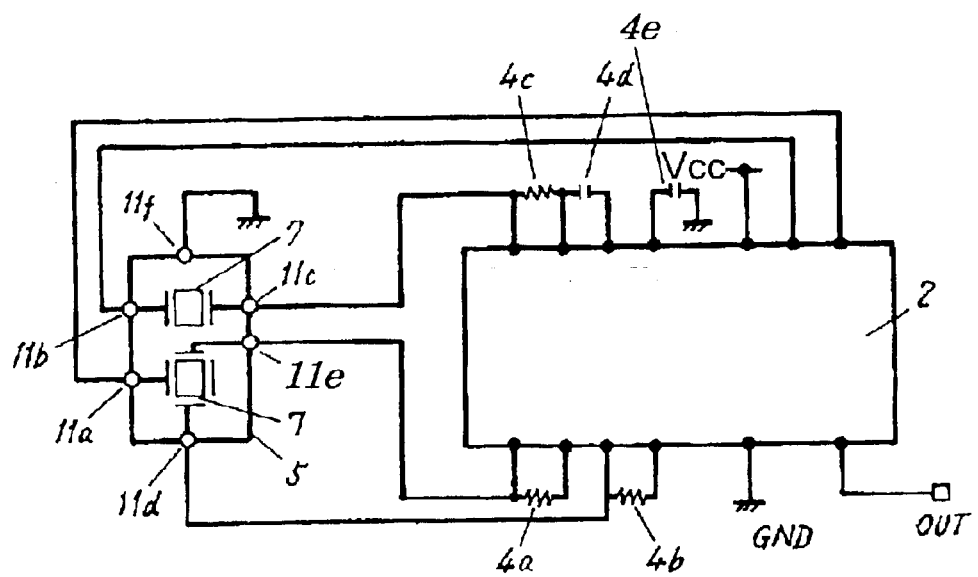
FIG. 9 is a block diagram showing the electric circuit in the first embodiment.

FIG. 9 is an electrical block diagram in embodiment 1.

Figure 10:
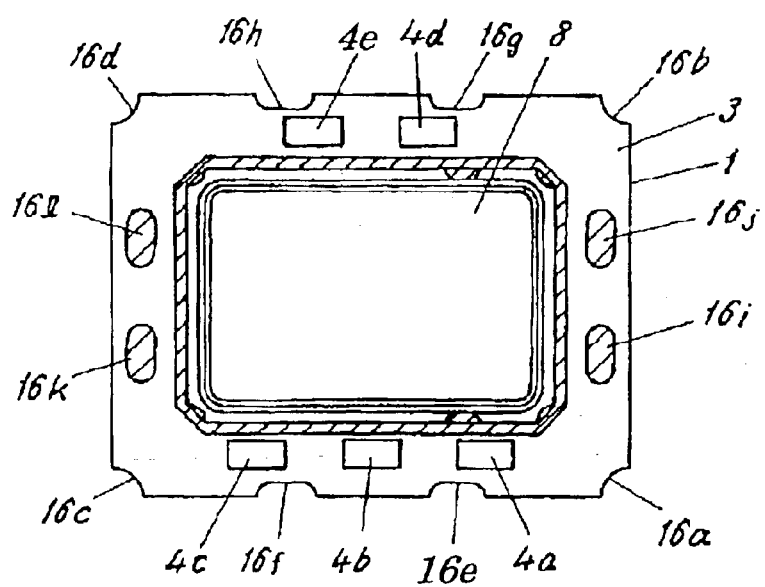
FIG. 10 is a plan view of first case of inertia detecting transducer, with inspection electrodes disposed on the upper surface.

FIG. 10 is a plan view of first case of an inertia detecting transducer in embodiment 1, with inspection electrodes disposed on the upper surface.

Referring to FIG. 1 through FIG. 10, both the first case 1 and the second case 6 are formed of laminated ceramic sheets. The cases have a box shape with an opening in the upper surface, as illustrated in FIGS. 2, 5 and 6. Inside the first case 1, an active device 2 formed of bare chip, which is one of constituent elements of the circuit components, is mounted and fixed by an adhesive.

Attached on a surrounding wall 3 of the first case 1 are passive devices 4a–4e, which device are another constituent elements of the circuit components. In the present example, the chip resistor and the chip capacitor are used for the passive devices 4a–4e.

The passive components in the present embodiment are mounted on the upper surface of the surrounding wall 3. Therefore, when mounting the passive components are connected to the surface by means of solder or a conductive adhesive, the solder or the conductive adhesive may be applied on the surface through a screen printing process. The screen printing process provides a high productivity.

Detection unit 5 is attached on the first case 1 covering the opening of first case 1. As shown in the FIGS. 1 through 3, 7 and 8, the detection unit 5 includes a second case 6, a seam ring 9, a quartz oscillator 7 and a metal shield plate 8.

The second case 6 is formed of a laminated ceramic body having an opening in the upper surface. The seam ring 9 is fixed on a surrounding wall 10 of the second case 6. The quartz oscillator 7 is a detection device for detecting an inertia force, which is mounted in the inside of the second case 6. The inertia force is detected by the quartz oscillator 7 in the form of change in the electric charge generated in accordance with the inertial force effecting thereon.

The metal shield plate 8 seals, as sealing plate, the opening of second case 6.

The quartz oscillator 7 is hermetically sealed within the second case 6 by welding the shield plate 8 to the seam ring 9, as illustrated in FIG. 8.

Besides the above-described welding method, the hermetic sealing can be accomplished instead by means of glass, solder or Au-Sn, etc.

The surrounding wall 10 of second case 6 is provided with a cut for six places on the outer side-wall, as illustrated in FIGS. 1, 2 and 7. Second connection electrodes 11a–11f are provided on the cuts, formed to cover the cut surface and part of the bottom surface area. The second connection electrodes 11a–11e are electrically coupled with the quartz oscillator 7, as shown in FIG. 9. The second connection electrode 11f is the grounding (GND) electrode, which is electrically connected with the second case 6 and the seam ring 9 and grounded together with the shield plate 8.

Meanwhile, the active device 2 mounted in the first case 1 is electrically connected by wire 12 with electrodes 13 provided in the first case 1, as illustrated in FIGS. 2, 5 and 6. The first case 1 is further provided, as illustrated in FIGS. 1, 2 and 5, with six first connection electrodes 14a–14f on the upper surface of surrounding wall 3, each for connection with either one of the electrodes 13.

The first connection electrodes 14a–14f and the second connection electrodes 11a–11f are electrically connected with the respective counterparts by means of conductive adhesive, or a solder; first connection electrode 14a with second connection electrode 11a, first connection electrode 14b with second connection electrode 11b, first connection electrode 14c with second connection electrode 11c, first connection electrode 14d with second connection electrode 11d, first connection electrode 14e with second connection electrode 11e, and first connection electrode 14f with second connection electrode 11f.

As shown in FIG. 7, the second connection electrodes 11a–11d are disposed in the surrounding wall 10 of second case 6 at the four corners of the outer side-wall surface. The first electrodes 14a–14d are disposed at the locations corresponding to the second connection electrodes 11a–11d. When making connection using solder or the like conductive adhesive, the detection unit 5 can be self-aligned relative to the first case 1 taking advantage of the surface tension of hardening solder.

The advantage of self-alignment reveals its significance when the connecting operation is made through a reflow soldering process.

The passive devices 4a–4e are also connected electrically by means of solder to respective patterns provided on the first case 1.

Thus the electrical connection among the crystal oscillator 7, the active device 2 and the passive devices 4a–4e is completed.

The active device 2 may be connected to the electrodes 13 through a flip tip mounting method instead of the connection with wire 12.

Figure 4:
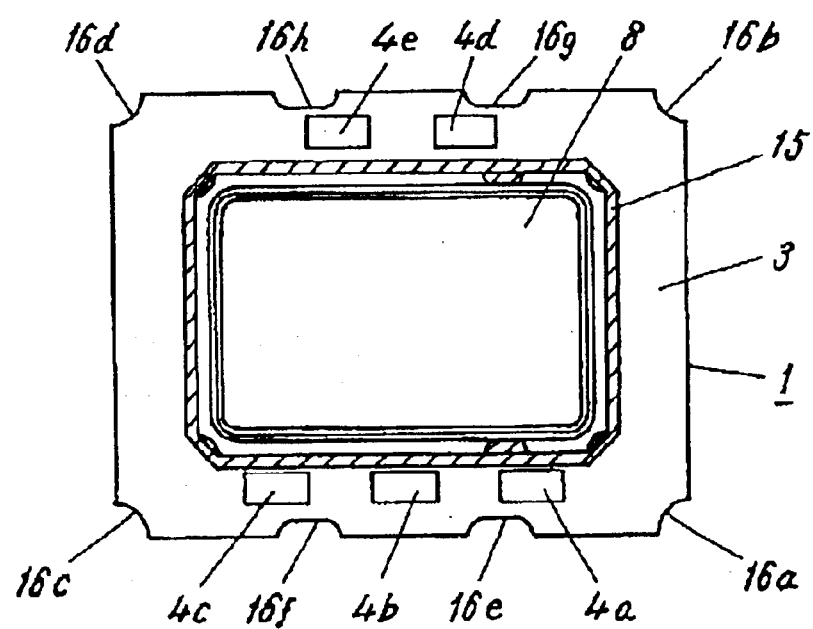
FIG. 4 is a plan view of the inertia detecting transducer in accordance with a first exemplary equipment.

After the electrical connection between the first connection electrodes 14a–14f and the second connection electrode 11a–11f is completed, the second case 6 is applied with a resin 15 along the outer circumference of the bottom for the purpose of adhesion and sealing, as shown in FIG. 3 and FIG. 4. Thus the second case 6 is attached firmly on the upper surface of surrounding wall 3 of the first, case 1. Consequently, the opening at: the top of the first case 1 is closed and sealed by the second case 6, thereby surely protecting the active device 2.

A resin encapsulation molding for the active device 2 can be eliminated by the introduction of the above-described sealing treatment. In a special case where the active device 2 requires a higher-grade protection, a resin encapsulating molding may be applied in addition.

The first case 1 is provided with cuts on the outer surface of surrounding wall 3, as shown in FIGS. 1 through 5 and 10. At the respective cuts, external electrodes 16a–16d, and inspection electrodes 16e–16h are provided. The external electrodes 16a, 16b, 16c and 16d are formed to cover the cut surface and extend to a part of the bottom surface of the, first case 1. The external electrode 16a is for power supply terminal (Vcc), the external electrode 16b is for output terminal (OUT), the external electrodes 16c and 16d are for the grounding terminal.

The inspection electrodes 16e, 16f, 16g and 16h are provided in the region elevated from the bottom level of first case for a certain specific predetermined distance. Therefore, the inspection electrodes are prevented from having a short-circuiting contact with a conductive pattern of circuit board on which the first case is mounted.

The inspection electrodes 16e–16h are used for writing data in the memory section of the active device 2, and for performing various kinds of inspections. This makes it possible to conduct inspections with the passive components being mounted in the first case. It also turns out to be possible to inspect an inertia detecting transducer in the completed state.

Referring to FIG. 10, inspection electrodes 16i–16l are provided on the upper surface of surrounding wall 3 of first case 1. With the present configuration, an inspection probe can make contact with the inspection electrodes 16i–16l from the above. The inspection can be made while a passive component is mounted in the first case.

The external electrodes 16a–16d are locating at the four corners of the outer wall-surface of surrounding wall 3 of first case 1. This configuration is advantageous when mounting an inertia detecting transducer on a circuit board by reflow soldering or the like automatic soldering process. Namely, an inertia detecting transducer can be self-aligned by taking advantage of the surface tension generated by a hardening solder. Thus, possible dislocation errors during mounting operation can be reduced to a minimum.

(Embodiment 2)

Figure 11:
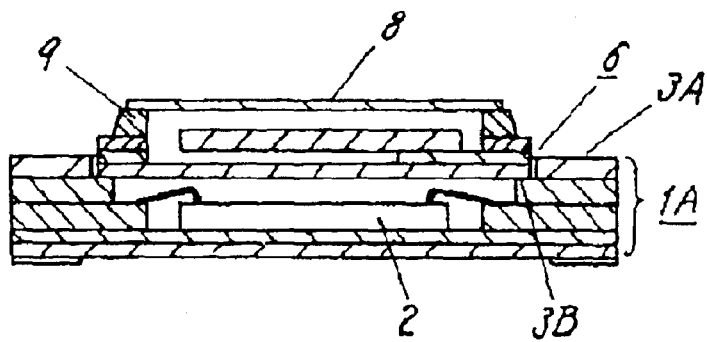
FIG. 11 is a cross sectional front view of an inertia detecting transducer in accordance with a second exemplary embodiment of the present invention.
Figure 12:
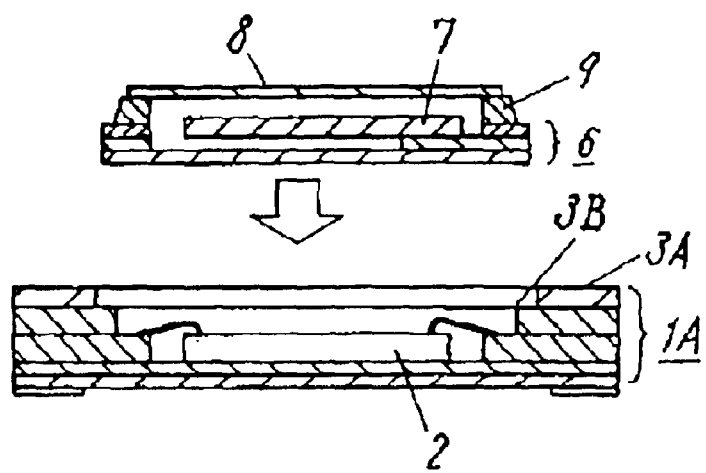
FIG. 12 is a cross sectional front view showing the inertia detecting transducer in a separated state.

FIG. 11 and FIG. 12 show the cross sectional front view and the exploded cross sectional view, respectively, of an inertia detecting transducer in a second exemplary embodiment of the present invention.

In the present embodiment 2, those constituent components identical to those in the embodiment 1 are represented by using the same numerals, and detailed description of which has been eliminated. Only the points of difference are described in detail.

In the first case 1A, a stepped part 3B including a recess is formed at the inner side of an upper surface of the surrounding wall 3A. The stepped part 3B supports the second case 6. A second case 6 can be automatically placed to a right position relative to the first case 1A, by simply fitting the second case 6 on the stepped part 3B. Consequently, the first connection electrodes 14a–14f and the second connection electrodes 11a–11f are also brought to the right relative positioning. Thus, the respective electrodes can be electrically connected with high reliability. The opening of first case 1A can be closed and sealed for sure by the second case 6, in the present embodiment.

(Embodiment 3)

Figure 13:
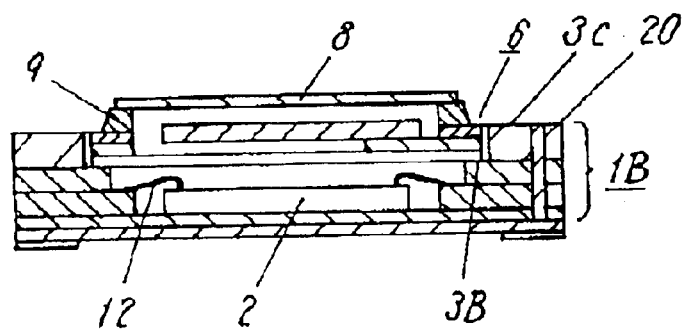
FIG. 13 is a cross sectional front view of an inertia detecting transducer in accordance with a third exemplary embodiment of the present invention.
Figure 14:
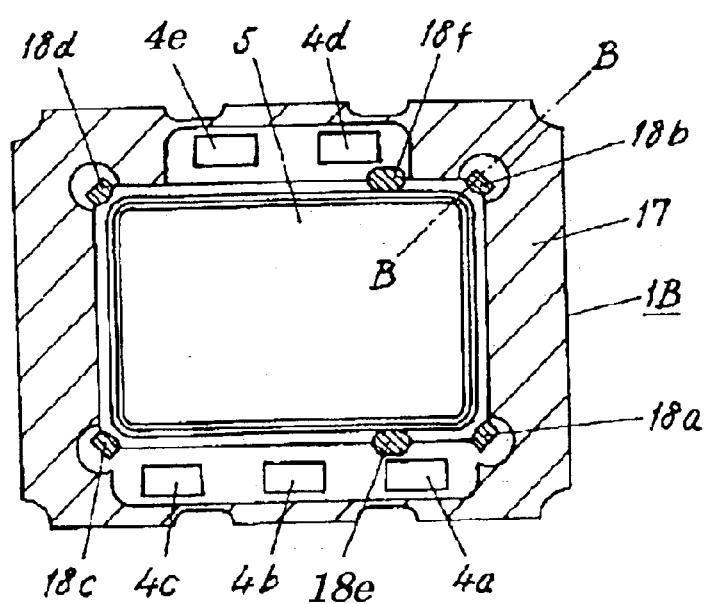
FIG. 14 is a plan view of the inertia detecting transducer.

FIG. 13 and FIG. 14 show the cross sectional front view and the plan view, respectively, of an inertia detecting transducer in a third exemplary embodiment of the present invention.

In the present embodiment 3, those constituent components identical to those in the embodiment 1 and the embodiment 2 are represented by using the same numerals, and the detailed description is eliminated. Only the points of difference are described in detail.

As illustrated in FIG. 13, surrounding wall 3C of the first case 1B is extended in the height to be higher than the surrounding wall 3A in embodiment 2. Specifically, the level of upper surface of surrounding wall 3C is higher than that of the second connection electrodes 11a–11f (the reference numeral indications are not given in the drawing) of the second case 6.

On the top of the surrounding wall 3C, a shield electrode 17 is provided, covering substantially the whole area avoiding making contact with the passive devices 4a–4e, as shown in FIG. 14. The shield electrode 17 is electrically connected via a conductive channel 20 formed in the surrounding wall 3C with the grounding terminal, namely the external electrode 16c or external electrode 16d. The reference numeral indications of external electrodes 16c and 16d are not given in the drawing.

The shield electrode 17 is effective for defending the respective connecting sections between the first connection electrodes 14a–14f and the second connection electrodes 11a–11f from external noise. Furthermore, the shield electrode 17 is effective in protecting the active device 2 against a possible electrostatic damage which could be caused by a touching finger of an assembly operator. The numeral indications 11a–11f, 14a–14f are not given in the drawing.

The upward extension of the surrounding wall 3C renders it difficult to supply the solder to each of the respective connection points between the first connection electrodes 14a–14f and the second connection electrodes 11a–11f. So as for the solder to be injected easily, cuts 18a–18f are formed to a depth reaching the level of the stepped part 3B at the places corresponding to the first connection electrodes 14a–14f and the second connection electrodes 11a–11f. The solder is injected inside the cuts 18a–18f, and the coupling between the first connection electrodes 14a–14f and the second connection electrodes 11a–11f is assured of a stable electrical connection.

The solder is injected in only the inside of the voids 18a–18f. The injected solder is covered with a resin 15 (not shown) for adhesion and sealing. Thereby, inadvertent short-circuiting between the shield electrode 17 and the first connection electrodes 14a–14f, second connection electrodes 11a–11f is prevented.

The above-described method of injecting solder and conductive adhesive via the cuts 18a–18f makes it easy and sure to connect the first connection electrodes with the second connection electrodes. As a result, the area of first and second connection electrodes can be reduced. This means easier protection against external noise.

Since the electrodes are locating in the cuts 18a–18f, adhesive strength by the conductive adhesive agent is enhanced.

Furthermore, since the conductive adhesive is applied only at a level lower than the opening of the cuts 18a–18f, the conductive adhesive will not cause a short-circuiting between the shield electrode, and the first and/or second connection electrodes.

(Embodiment 4)

Figure 15:
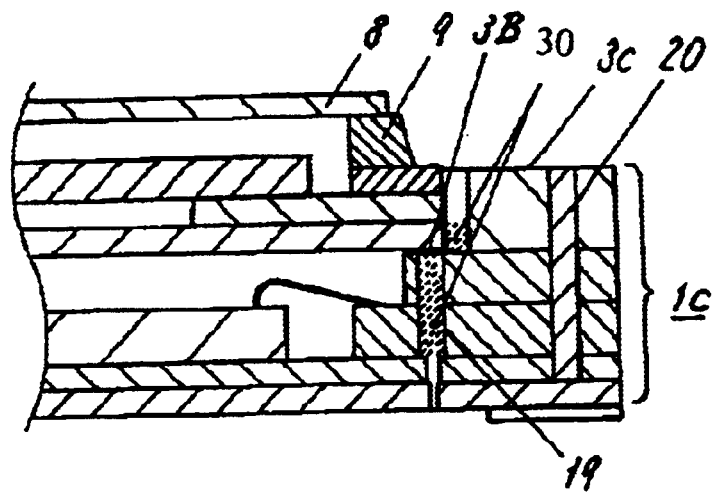
FIG. 15 is a cross sectional view in a key part of an inertia detecting transducer, so as to describe a fourth exemplary embodiment of the present invention.

FIG. 15 is a cross sectional view of a key part, so as to describe an inertia detecting transducer in a fourth exemplary embodiment of the present invention.

In the present embodiment 4, those constituent components identical to those in the embodiment 1 through embodiment 3 are represented by using the same reference numerals, and detailed description of which has been eliminated. Only the points of difference are described in detail.

FIG. 15 shows a cross sectional view sectioned along the line B—B indicated in FIG. 14.

FIG. 15 gives a detailed illustration of a hole 19 provided in the first case 1C; the hole is proceeding downward starting from the stepped part 3B and the diameter is decreased at a certain depth and further. When the first connection electrodes 14a–14f and the second connection electrodes 11a–11f are connected with solder at each of corresponding counterparts, the hole 19 works to prevent a possible short-circuiting trouble caused by the solder 30 spreading outside the region of first connection electrodes 14a–14f and the second connection electrodes 11a–11f. Namely, the hole 19 receives In it the superfluous solder.

If the hole 19 is a straight hole, the solder may proceed through the hole to flow out of the first case 1C. The reduced hole diameter prevents the solder from flowing put.

Thus the solder and conductive adhesive are prevented from going out through the hole. As a result, a possible trouble in the electrical conduction between the first connection electrodes and the second connection electrodes is prevented.

(Embodiment 5)

Figure 16:
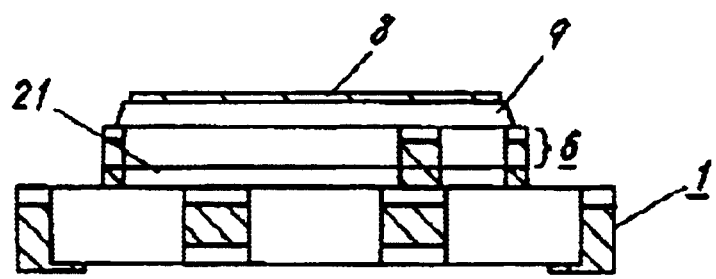
FIG. 16 is a front view showing an inertia detecting transducer in accordance with a fifth exemplary embodiment of the present invention.
Figure 17:
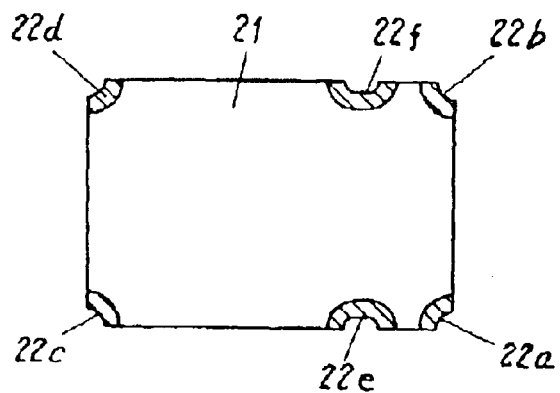
FIG. 17 shows the plan view of an elastic member in the fifth embodiment.

FIG. 16 and FIG. 17 show front view of an inertia detecting transducer in accordance with a fifth exemplary embodiment of the present invention and plan view of the elastic member, respectively.

In the present embodiment 5, those constituent components identical to those in the embodiment 1 are represented by using the same numerals, and the detailed description is omitted. Only the points of difference are described in detail.

As shown in FIG. 16, the first case 1 and the second case 6 are connected and electrically coupled together via a thin elastic member 21. The elastic member 21 is provided with third connection electrodes 22a–22f, each of which electrodes is stretching to cover the both surfaces, at places corresponding to the first connection electrodes 14a–14f and the second connection electrodes 11a–11f, as shown in FIG. 17. The elastic member 21 is integrally formed of a silicone insulating material and a conductive material of carbon-containing silicone.

The first connection electrodes 14a–14f and the third connection electrodes 22a–22f are connected at the respective corresponding electrodes with solder; so are the second connection electrodes 11a–11f and the third connection electrodes 22a–22f. Thereby, the detection unit 5 is held elastically.

In the above-described configuration, the detection element mounted inside the second case is supported elastically. Thereby, deterioration in the detection signal level of the detection element is suppressed, which contributes to provide stable operating characteristics.

The base area of the elastic member is substantially identical to an area with which the first case and the second case are overlapping. Furthermore, the elastic member is provided with third connection electrodes for electrically coupling the first connection electrodes and the second connection electrodes together. As a result, the cases are coupled together elastically including the electrodes portion.

The present embodiment 5 is aimed to support a detection unit 5 elastically. Therefore, fixing of the detection unit 5 by means of the resin 15 for gluing and sealing, which was employed in the embodiment 1, is not applied here in embodiment 5.

Although a silicone is used for the insulating material of elastic member 21 in the description of the present embodiment 5, any other material may be used in so far as it has an elastic property suitable to the anti-vibration performance.

The elastic member of present embodiment may be integrated with the structures described earlier in the embodiments 1 through 4.

Integration of the elastic member with the other structures will create new advantages, in which the intrinsic features provided by the original configuration and the advantages due to the elasticity are well combined. Thus it will provide more useful advantages.

(Embodiment 6)

Figure 18:
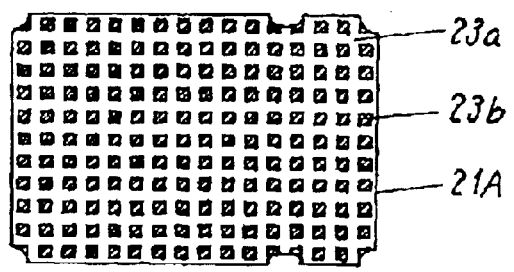
FIG. 18 shows the plan view of an elastic member of an inertia detecting transducer in accordance with a sixth exemplary embodiment of the present invention.
Figure 19:
FIG. 19 is the cross sectional front view of the transducer of a sixth exemplary embodiment.

FIG. 18 and FIG. 19 show plan view and cross sectional front view of an elastic member of an inertia detecting transducer in accordance with a sixth exemplary embodiment of the present invention.

In the present embodiment 6, the elastic member 21 of FIG. 16 is replaced with another equivalent formed of different material.

Referring to FIG. 18 and FIG. 19, an elastic member 21A is formed of an insulating silicone material 23a and a carbon-containing conductive material 23b bound together at a certain specific predetermined pitch, laminated and sliced to a certain thickness. This is called an anisotropic conductive rubber. The elastic member 21A thus provided makes it possible to couple the first connection electrodes 14a–14f and the second connection electrodes 11a–11f, at their respective corresponding electrodes, without employing the third electrodes as described in the embodiment 5.

Although a silicone is used for the insulating material of elastic member 21A in the description of the present embodiment, any other materials may be used in so far as it has an elastic property suitable to the anti-vibration performance.

The elastic member of present embodiment may be integrated with the structures described earlier in the embodiments 1 through 5.

Integration of the elastic member of present embodiment with the other structures will create new advantages, in which the intrinsic features provided by the original configuration and the advantages due to the elastic member are well combined. Thus it will provide more useful advantages.

(Embodiment 7)

Figure 20:
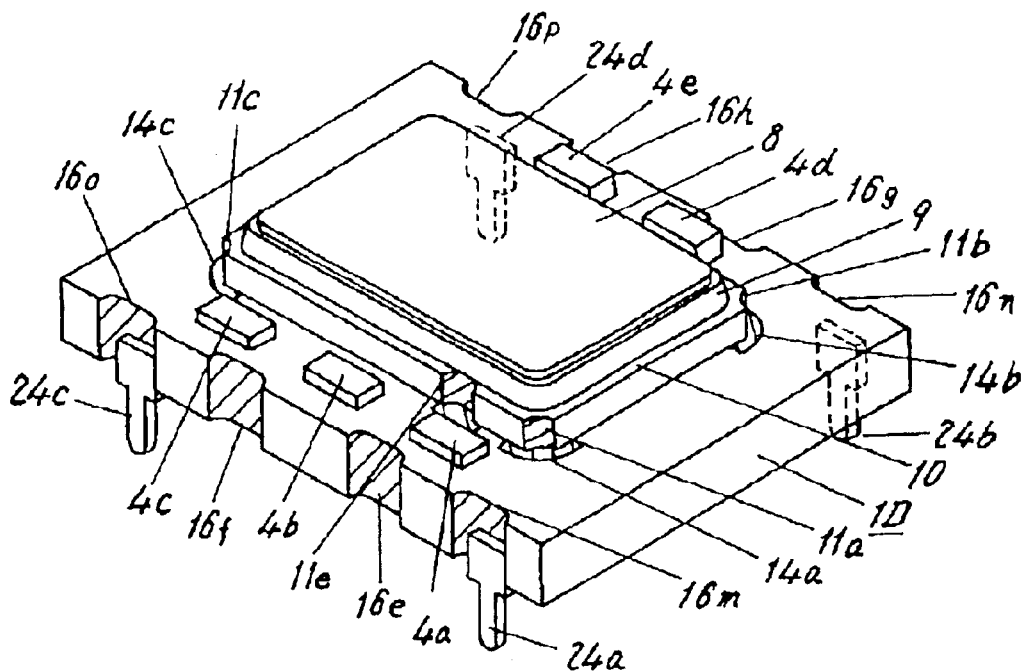
FIG. 20 is a perspective view showing an inertia detecting transducer in accordance with a seventh exemplary embodiment of the present invention.
Figure 21:
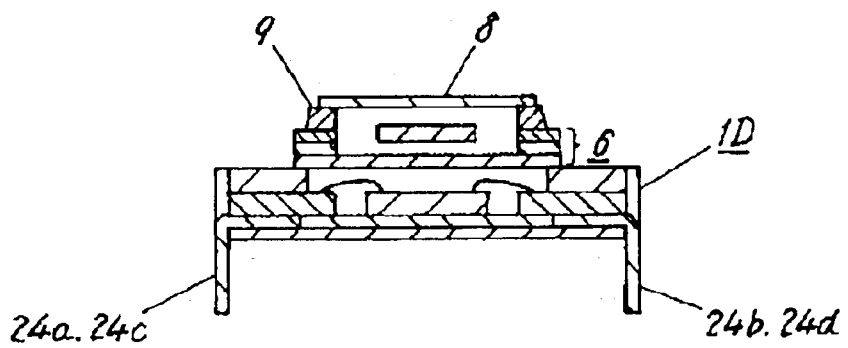
FIG. 21 is a cross sectional view of the inertia detecting transducer in the seventh embodiment.

FIG. 20 and FIG. 21 show perspective view and cross sectional view, respectively, of an inertia detecting transducer in accordance with a seventh exemplary embodiment of the present invention.

In the present embodiment, those constituent components identical to those in the embodiment 1 are represented by using the same numerals, and the detailed description is omitted. Only the points of difference are described in detail.

As shown in FIG. 20, terminals 24a–24d are fixed by brazing onto the first case 1D at the external electrodes 16m–16p. The terminals 24a–24d are made of a conductive solder-plated steel sheet in a size adapted to round holes of a mounting board for insertion.

The terminal pieces 24a–24d may be provided at the same time when the first case 1D is made by a laminating method. For example, terminal pieces 24a–24d of strip shape may be laminated during manufacture of the first case 1D by laminating ceramic sheets. Conduction among respective layers of external electrodes, as well as connection between respective external electrodes and the terminals 24a–24d, are also accomplished simultaneously. And then, the terminals 24a–24d are bent to a certain specific predetermined form.

When an inertia detecting transducer is mounted on a board by making use of the terminal pieces 24a–24d, it can be mounted to a place with an improved accuracy. Furthermore, the mounting by means of terminals opens the way to use the inertia detecting transducers for a printing circuit board in which the surface mounting is not possible, and in rough operating conditions, such as in an automobile, where the requirement in mounting reliability is more stringent.

The terminals 24a–24d may be manufactured integrally with the first case 1D. In this case, the reliability is improved a step further.

Descriptions in the above embodiment 1 through embodiment 7 are based on the first and the second cases both manufactured in the form of laminated ceramic sheets. Besides the structure formed of laminated sheets, the cases may be provided in other ways, for example, by molding or by machining of an ingot. Besides the ceramic material, other kinds of material such as glass epoxy may of course be used for providing the cases.

Although descriptions of the embodiment 1 through embodiment 7 are based on the detection device including a quartz oscillator, it is not the intention of the present invention to limit the detection device to the quartz oscillator. Any other material may be used for the purpose, in so far as its physical quantity changes in accordance with inertia and quantity of the change is detected in terms of electric signal.

Industrial Applicability

In an inertia detecting transducer of the present invention, a first case has an opening and mounted with a circuit component. The case is provided with external electrodes and first connection electrodes. A second case is mounted with a detection element, an opening of which case is sealed with a sealing plate, and is provided with second connection electrodes. The second case is attached to the first case so that the former covers opening of the latter. The second and the first connection electrodes are electrically coupled.

Therefore, a detection element, which is the key sensing component, is kept to be free from deposition of gas and organic substance generated from resin adhesive used for fixing a circuit component, as well as from sputtering solder and flux.

Thus, the inertia detecting transducers having highly reliable detection element are produced. In addition, even if the inertia detecting transducer is partly damaged during mounting of circuit components or the characteristics adjustment, either one of the detection element and the circuit components left undamaged can be re-used.

Although the foregoing descriptions are made with respect to the inertia detecting transducer for detecting inertia force, the structures proposed by the present invention may of course be applied to any other kinds of sensor devices for detecting physical quantities.

What is claimed is:

1. An inertia detecting transducer comprising:

a first case having an opening and mounted with a circuit component, including an external electrode and a first connection electrode; and a second case mounted with a detection element, having an opening sealed with a sealing plate, including a second connection electrode, wherein
      said second case Is attached to said first case, while said second case covers an opening of said first case, and said second connection electrode and said first connection electrode are electrically coupled, wherein a stepped part forming a recess is provided in an upper surface of a surrounding wall of said first case, and said second case is supported by the stepped part.

2. The inertia detecting transducer of claim 1, wherein said external electrode is formed in at least two corners of a surrounding wall of said first case, covering a lower part of a side-wall and a part of a bottom surface of said first case.

3. The inertia detecting transducer of claim 2, wherein said external electrode is disposed on an outer side of the surrounding wall of said first case, and said external electrode has a terminal for inserting into a land hole of a circuit board.

4. The inertia detecting transducer of claim 3, wherein said terminal is laminated integrally with said first case.

5. The inertia detecting transducer of claim 1, wherein said first connection electrode is provided for at least two places on an upper surface of a surrounding wall of said first case, said second connection electrode is provided in said second case covering a lower part and a part of a bottom surface of the surrounding wall at a location corresponding to said first connection electrode.

6. The inertia detecting transducer of claim 1, wherein an active component is mounted within said first case, while a passive component is mounted on an upper surface of a surrounding wall of said first case.

7. The inertia detecting transducer recited in claim 6, wherein
   an inspection electrode is provided on an outer side-wall of a surrounding wall of said first case, and said inspection electrode is disposed in a region being separated from a bottom of said first case for a predetermined distance.

8. The inertia detecting transducer recited in claim 1, wherein
   an inspection electrode is provided on an outer side-wall of a surrounding wall of said first case, and said inspection electrode is disposed in a region being separated from a bottom of said first case for a predetermined distance.

9. The inertia detecting transducer of claim 1, wherein an inspection electrode is provided on an upper surface of a surrounding wall of said first case, said inspection electrode is disposed at a place away from said first connection electrode for a predetermined distance.

10. The inertia detecting transducer of claim 1, wherein a resin for gluing and sealing is provided along a proximity of a bottom outer circumference of said second case.

11. The inertia detecting transducer of claim 1, wherein an upper surface of the surrounding wall of said first case is disposed to be above said second connection electrode of said second case, and said first case is provided with a shield electrode on the upper surface of the surrounding wall.

12. The inertia detecting transducer recited in claim 11, wherein
   a cut Is formed downward from the upper surface of the surrounding wall of the first case towards an upper surface of the stepped part, at a place in an inner side-wall of the surrounding wall of said first case, and the place corresponds to said second connection electrode of said second case.

13. The inertia detecting transducer of claim 12, wherein an electrode is provided on an inner surface of the cut.

14. The inertia detecting transducer recited in claim 13, wherein
   the cut is filled with a conductive adhesive only in a space below an opening of the cut.

15. The inertia detecting transducer recited in claim 13, wherein
   a hole is provided at a location, in a bottom of the stepped part of said first case, corresponding to said second connection electrode of said second case.

16. The inertia detecting transducer recited in claim 12, wherein
   the cut is filled with a conductive adhesive only in a space below an opening of the cut.

17. The inertia detecting transducer recited in claim 16, wherein
a hole is provided at a location, in a bottom of the stepped part of said first case, corresponding to said second connection electrode of said second case.

18. The inertia detecting transducer recited in claim 11, wherein
a hole is provided at a location, in a bottom of the stepped part of said first case, corresponding to said second connection electrode of said second case.

19. The inertia detecting transducer of claim 18, wherein a diameter of the hole provided in the stepped part of said first case decreases in a lower section.

20. The inertia detecting transducer recited in claim 12, wherein
a hole is provided at a location, in a bottom of the stepped part of said first case, corresponding to said second connection electrode of said second case.

21. The inertia detecting transducer recited in claim 1, wherein
a cut is formed downward from the upper surface of the surrounding wall of the first case towards an upper surface of the stepped part, at a place in an inner side-wall of the surrounding wall of said first case, and the place corresponds to said second connection electrode of said second case.

22. The inertia detecting transducer of claim 21, wherein an electrode is provided on an Inner surface of the cut.

23. The inertia detecting transducer recited in claim 22, wherein
the cut is filled with a conductive adhesive only in a space below an opening of the cut.

24. The inertia detecting transducer recited in claim 22, wherein
a hole is provided at a location, in a bottom of the stepped part of said first case, corresponding to said second connection electrode of said second case.

25. The inertia detecting transducer recited in claim 21, wherein
the cut is filled with a conductive adhesive only in a space below an opening of the cut.

26. The inertia detecting transducer recited in claim 25, wherein
a hole is provided at a location, in a bottom of the stepped part of said first case, corresponding to said second connection electrode of said second case.

27. The inertia detecting transducer recited in claim 21, wherein
a hole is provided at a location, in a bottom of the stepped part of said first case, corresponding to said second connection electrode of said second case.

28. The inertia detecting transducer recited in claim 1, wherein
a hole Is provided at a location, in a bottom of the stepped part of said first case, corresponding to said second connection electrode of said second case.

29. The inertia detecting transducer of claim 28, wherein a diameter of the hole provided in the stepped part of said first case decreases in a lower section.

30. The inertia detecting transducer of claim 1, wherein said second connection electrode and said first connection electrode are electrically coupled via an elastic member.

31. The inertia detecting transducer of claim 30, wherein a third connection electrode, for electrically coupling said first connection electrode and said second connection electrode, is formed in said elastic member.

32. The inertia detecting transducer of claim 30, wherein said elastic member has an anisotropic conductivity.

33. The inertia detecting transducer of claim 30, wherein said external electrode is formed in at least two corners of a surrounding wall of said first case, covering a lower region and a part of a bottom surface of said first case.

34. The inertia detecting transducer of claim 33, wherein said external electrode is disposed on an outer side of the surrounding wall of said first case, and said external electrode has a terminal for inserting into a land hole of a circuit board.

35. The inertia detecting transducer of claim 34, wherein said terminal is laminated integrally with said first case.

36. The inertia detecting transducer of claim 30, wherein an active component is mounted within said first case, while a passive component is mounted on an upper surface of a surrounding wall of said first case.

37. The inertia detecting transducer of claim 30, wherein said first case is provided with an inspection electrode on the outer side-wall of surrounding wall, said inspection electrode being disposed elevated from the bottom of said first case for a certain specific distance.

38. The inertia detecting transducer of claim 30, wherein an inspection electrode is provided on an upper surface of a surrounding wall of said first case, and said inspection electrode is disposed In a region being separated from said first connection electrode for a predetermined distance.

39. An inertia detecting transducer comprising:
a first case having an opening and mounted with a circuit component, including an external electrode and a first connection electrode; and
a second case mounted with a detection element having an opening sealed with a sealing plate including a second connection electrode, wherein
said second case is attached to said first case, while said second case covers an opening of said first case, and said second connection electrode and said first connection electrode are electrically coupled.
wherein said second connection electrode and said first connection electrode are electrically coupled via an elastic member,
wherein a stepped part forming a recess is provided in an upper surface of a surrounding wall of said first case, and said second case is supported by the stepped part.

40. The inertia detecting transducer of claim 39, wherein an upper surface of the surrounding wall of said first case is disposed to be above said second connection electrode of said second case, and said first case is provided with a shield electrode an the upper surface of surrounding wall.

41. The inertia detecting transducer recited in claim 40, wherein
a cut is formed downward from the upper surface of the surrounding wall of the first case towards an upper surface of the stepped part, at a place in an inner side-wall of the surrounding wall of said first case, and the place corresponds to said second connection electrode of said second case.

42. The inertia detecting transducer of claim 41, wherein an electrode is provided on an inner surface of the cut.

43. The inertia detecting transducer recited in claim 42, wherein
a hole is provided at a location, in a bottom of the stepped part of said first case, corresponding to said second connection electrode of said second case.

44. The inertia detecting transducer recited in claim 41, wherein
the cut is filled with a conductive adhesive only in a space below an opening of the cut.

45. The inertia detecting transducer recited in claim 44, wherein
a hole is provided at a location, in a bottom of the stepped part of said first case, corresponding to said second connection electrode of said second case.

46. The inertia detecting transducer recited in claim 41, wherein
a hole is provided at a location, in a bottom of the stepped part of said first case, corresponding to said second connection electrode of said second case.

47. The inertia detecting transducer recited in claim 40, wherein
a hole is provided at a location, in a bottom of the stepped part of said first case, corresponding to said second connection electrode of said second case.

48. The inertia detecting transducer of claim 47, wherein
a diameter of the hole provided in the stepped part of said first case decreases in a lower section.

49. The inertia detecting transducer recited in claim 39, wherein
a cut is formed downward from the upper surface of the surrounding wall of the first case towards an upper surface of the stepped part, at a place in an inner side-wall of the surrounding wall of said first case, and the place corresponds to said second connection electrode of said second case.

50. The inertia detecting transducer of claim 49, wherein
an electrode is provided on an inner surface of the cut.

51. The inertia detecting transducer recited in claim 50, wherein
the cut is filled with a conductive adhesive only in a space below an opening of the cut.

52. The inertia detecting transducer recited in claim 50, wherein
a hole is provided at a location, in a bottom of the stepped part of said first case, corresponding to said second connection electrode of said second case.

53. The inertia detecting transducer recited in claim 49, wherein
the cut is filled with a conductive adhesive only in a space below an opening of the cut.

54. The inertia detecting transducer recited in claim 53, wherein
a hole is provided at a location, in a bottom of the stepped part of said first case, corresponding to said second connection electrode of said second case.

55. The inertia detecting transducer recited In claim 49, wherein
a hole is provided at a location, in a bottom of the stepped part of said first case, corresponding to said second connection electrode of said second case.

56. The inertia detecting transducer recited in claim 39, wherein
a hole is provided at a location, in a bottom of the stepped part of said first case, corresponding to said second connection electrode of said second case.

57. The inertia detecting transducer of claim 56, wherein
a diameter of the hole provided in the stepped part of said first case decreases in a lower section.

* * * * *

UNITED STATES PATENT AND TRADEMARK OFFICE
CERTIFICATE OF CORRECTION

PATENT NO. : 6,748,807 B2
DATED : June 15, 2004
INVENTOR(S) : Yoshiuchi et al.

It is certified that error appears in the above-identified patent and that said Letters Patent is hereby corrected as shown below:

Column 9,
Line 51, after the first occurrence of "case" delete "Is" and insert -- is --.

Column 10,
Line 45, after "cut" delete "Is" and insert -- is --.

Column 11,
Line 28, after the second occurrence of "an" delete "Inner" and insert -- inner --.
Line 54, after "hole" delete "Is" and insert -- is --.

Signed and Sealed this

Twenty-second Day of February, 2005

JON W. DUDAS
*Director of the United States Patent and Trademark Office*